United States Patent
Soejima

(10) Patent No.: US 7,343,887 B2
(45) Date of Patent: Mar. 18, 2008

(54) APPARATUS FOR ABNORMAL DIAGNOSIS OF VARIABLE VALVE TIMING MECHANISM

(75) Inventor: Shinichi Soejima, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 373 days.

(21) Appl. No.: 10/552,252

(22) PCT Filed: Apr. 5, 2004

(86) PCT No.: PCT/JP2004/004928

§ 371 (c)(1),
(2), (4) Date: Oct. 5, 2005

(87) PCT Pub. No.: WO2004/092549

PCT Pub. Date: Oct. 28, 2004

(65) Prior Publication Data

US 2007/0101959 A1     May 10, 2007

(30) Foreign Application Priority Data

Apr. 15, 2003    (JP) ............... 2003-109762

(51) Int. Cl.
    *F01L 1/34* (2006.01)
(52) U.S. Cl. ............... 123/90.15; 123/90.16; 123/90.17; 123/90.31; 701/102; 701/105; 701/107; 464/1; 464/2; 464/160; 92/121; 92/122
(58) Field of Classification Search ............ 123/90.15; 701/107
See application file for complete search history.

(56) References Cited

U.S. PATENT DOCUMENTS

| | | | |
|---|---|---|---|
| 5,289,805 | A | 3/1994 | Quinn, Jr. et al. |
| 5,979,378 | A | 11/1999 | Matsuno et al. |
| 6,079,381 | A | 6/2000 | Morikawa |
| 6,257,184 | B1 | 7/2001 | Yamagishi et al. |
| 6,488,008 | B1 | 12/2002 | Jankovic et al. |
| 6,615,778 | B2 | 9/2003 | Iwaki et al. |
| 6,862,514 | B2 * | 3/2005 | Ehara ............ 701/102 |

(Continued)

FOREIGN PATENT DOCUMENTS

DE      100 38 072 A1    2/2001

(Continued)

*Primary Examiner*—Thomas Denion
*Assistant Examiner*—Kyle M. Riddle
(74) *Attorney, Agent, or Firm*—Oliff & Berridge, PLC

(57) ABSTRACT

An abnormality diagnosis system 100 includes a VVT controller 110, an adjustable valve mechanism 120, a cam angle sensor 130, a model computation module 140, an abnormality detection module 150, and an alarm lamp 160. The adjusable valve mechanism 120 advances or delays a phase angle of an intake cam shaft relative to a crankshaft, thereby varying an open-close timing of a valve. The model computation module 140 computes a physical behavior of the adjustable valve mechanism 120 according to a physical model, in response to a control signal input from the VVT controller 110. The abnormality detection module 150 determines whether the adjustable valve mechanism 120 is abnormal or normal, based on a difference between a theoretical value of phase angle calculated according to the physical model and an observed value of phase angle measured with the cam angle sensor 130. The arrangement of the invention ensures highly accurate abnormality diagnosis of the adjustable valve mechanism 120.

16 Claims, 7 Drawing Sheets

U.S. PATENT DOCUMENTS 6,885,976 B2 * 4/2005 Yoshiki et al. .............. 702/185
2002/0062798 A1 5/2002 Iwaki et al.

FOREIGN PATENT DOCUMENTS

| JP | A-10-018869 | 1/1998 |
| JP | A-2000-110594 | 4/2000 |
| JP | A-2001-050063 | 2/2001 |
| JP | A-2001-050064 | 2/2001 |
| JP | A-2001-055934 | 2/2001 |
| JP | A-2001-303999 | 10/2001 |
| JP | A-2002-161789 | 6/2002 |

* cited by examiner

APPARATUS FOR ABNORMAL DIAGNOSIS OF VARIABLE VALVE TIMING MECHANISM

TECHNICAL FIELD

The present invention relates to a technique of diagnosing an abnormality in an adjustable valve mechanism.

BACKGROUND ART

An adjustable valve mechanism is often applied to an internal combustion engine mounted on a vehicle for the enhanced output, the reduced fuel consumption, and the reduced emission. The adjustable valve mechanism varies a valve characteristic, such as an open-close timing or an opening-closing lift quantity of a valve.

Diverse techniques have been proposed to diagnose an abnormality of this adjustable valve mechanism. For example, the technique disclosed in Japanese Patent Laid-Open Gazettes No. 2002-161789 and No. 2001-303999 given below calculates a difference between a target phase angle of a cam shaft and an actual phase angle measured by a cam angle sensor and compares the calculated difference with a preset threshold value to determine abnormality or normality of the adjustable valve mechanism. The technique disclosed in Japanese Patent Laid-Open Gazette No. 10-18869 given below detects a phase difference between a crankshaft and the cam shaft corresponding to each control state of the adjustable valve mechanism and compares the detected phase difference with a predetermined reference value for the control state, so as to diagnose an abnormality of the adjustable valve mechanism.

The technique disclosed in Japanese Patent Laid-Open Gazettes No. 2002-161789 and No. 2001-303999 determines abnormality of the adjustable valve mechanism, based on a result of the comparison between the target phase angle and the actually observed phase angle. For example, when the target phase angle is set at a higher speed than the response of the adjustable valve mechanism, a phase difference inevitably arises even in the normal state of the adjustable valve mechanism. Namely the abnormality of the adjustable valve mechanism is mistakenly detected. The abnormality diagnosis technique having the higher accuracy has thus been highly demanded.

The technique disclosed in Japanese Patent Laid-Open Gazette No. 10-18869 assumes two control states, that is, a state of effective control and a state of no control, as the control state of the adjustable valve mechanism. The latest adjustable valve mechanism, however, can continuously vary the open-close timing or the opening-closing lift quantity of the valve. Complicated situation-based settings of the reference value are thus required corresponding to the continuously varying open-close timing or opening-closing lift quantity of the valve. An extremely large amount of labor is then required for experiments to validate the settings of the reference value. It is accordingly difficult to apply the reference values to another type of the vehicle. Another related document is Japanese Patent Laid-Open Gazette No. 2000-110594.

DISCLOSURE OF THE INVENTION

The object of the invention is thus to solve the problems discussed above and to provide a versatile and highly accurate abnormality diagnosis technique that diagnoses an abnormality of an adjustable valve mechanism.

In order to attain at least part of the above and the other related objects, the present invention is directed to a first abnormality diagnosis apparatus that diagnoses an abnormality of an adjustable valve mechanism, which varies a moving characteristic of a valve in an internal combustion engine. The first abnormality diagnosis apparatus includes: a control signal input module that inputs a control signal for varying the moving characteristic of the valve; a theoretical value computation module that computes a physical behavior of the adjustable valve mechanism according to a physical model and thereby calculates a theoretical value of a parameter relating to the moving characteristic of the valve, which is varied by the adjustable valve mechanism, in response to the input control signal; an observed value detection module that detects an observed value of the parameter relating to the moving characteristic of the valve, which is varied by the adjustable valve mechanism, in response to the input control signal; and an abnormality detection module that determines whether the adjustable valve mechanism is abnormal or normal, based on the theoretical value and the observed value.

The parameter relating to the moving characteristic of the valve is, for example, an open-close timing of the valve, an opening-closing lift quantity of the valve, or a phase angle of a cam shaft to vary the open-close timing of the valve. The abnormality diagnosis apparatus of the invention determines abnormality of the adjustable valve mechanism, based on a result of the comparison between the observed value of the parameter relating to the moving characteristic of the valve and the theoretical value of the parameter computed according to the physical model. This arrangement enhances accuracy of abnormality diagnosis.

For example, it is assumed that a signal for setting a target phase angle of the cam shaft is input as the control signal. In this case, the abnormality diagnosis apparatus of the invention estimates a phase angle of the cam shaft (theoretical value), which varies with a variation in target phase angle, by computation according to the physical model and compares the theoretical value of the phase angle with an actually observed value of the phase angle to determine abnormality of the adjustable valve mechanism. Even in the case of an abrupt change of the target phase angle, this arrangement effectively estimates the behavior of the adjustable valve mechanism in the normal state, thus ensuring highly accurate abnormality diagnosis.

The abnormality diagnosis apparatus of the invention does not require complicated situation-based settings of a reference value for determination of abnormality according to the control conditions of the adjustable valve mechanism. The abnormality diagnosis apparatus is thus readily applicable to various types of vehicles.

In one preferable application of the first abnormality diagnosis apparatus of the invention, the abnormality detection module determines that the adjustable valve mechanism is abnormal, when a difference between the theoretical value and the observed value is out of a preset range. Abnormality of the adjustable valve mechanism may otherwise be determined, based on a difference between a theoretical value and an observed value of a variation per unit time or a rate of change.

The present invention is also directed to a second abnormality diagnosis apparatus that diagnoses an abnormality of an adjustable valve mechanism, which changes a phase of a cam shaft for opening and closing a valve in an internal combustion engine relative to a crankshaft of the internal combustion engine and thereby varies an opening-closing characteristic of the valve. The second abnormality diagnosis apparatus includes: a fluid actuator that takes advantage of a pressure difference between two pressure chambers and thereby changes a phase difference between the cam shaft and the crankshaft; a fluid control valve that switches over a state between a supply and a discharge of a working fluid to and from each of the two pressure chambers of the fluid actuator; a control unit that outputs a control signal to the fluid control valve to switch over the state between the supply and the discharge of the working fluid; a sensor that actually measures a phase difference between the cam shaft and the crankshaft; a computation module that computes a pressure difference between the two pressure chambers in response to at least the control signal output from the control unit and calculates a phase difference between the cam shaft and the crankshaft from the computed pressure difference; and a determination module that compares the actual phase difference measured by the sensor with the calculated phase difference and determines that at least one of the fluid actuator and the fluid control valve is abnormal when a difference between the calculated phase difference and the measured phase difference is not less than a preset value.

This arrangement effectively determines abnormality of at least one of the fluid actuator and the fluid control valve in the adjustable valve mechanism.

In one preferable application of the invention, the second abnormality diagnosis apparatus further includes a revolution speed sensor that measures a revolution speed of the internal combustion engine. The computation module has a pressure difference computation module that uses an arithmetic expression based on a model constructed with flows of the working fluid in the fluid actuator and the fluid control valve and with a reactive force of the cam shaft, which depends upon the revolution speed of the internal combustion engine and is applied from the cam shaft onto the fluid actuator, and computes the pressure difference between the two pressure chambers with the control signal output from the control unit and the revolution speed of the internal combustion engine as parameters.

In the adjustable valve mechanism where the behavior of the fluid actuator is affected by the reactive force of the cam shaft, the arithmetic expression used by the computation module follows the model that takes into account the reactive force of the cam shaft as well as the flows of the fluid in the fluid actuator and the fluid control valve. This arrangement enables the pressure difference between the two pressure chambers of the fluid actuator to be computed with high accuracy.

The arithmetic expression used by the computation module to compute the pressure difference may follow a model, which takes into account leakage of the working fluid between the two pressure chambers of the fluid actuator. The leakage of the working fluid between the two pressure chambers varies the pressure difference. Application of the arithmetic expression according to the model that takes into account such leakage further enables the pressure difference to be computed with higher accuracy.

The working fluid in the fluid actuator may be water, oil, or another incompressible fluid. The working fluid may have temperature-dependent viscosity, as in the case of typical working oil. The time-based behavior of the pressure difference between the two pressure chambers in the fluid actuator is changed with a variation in viscosity of the working fluid depending upon the temperature. One preferable embodiment of the second abnormality diagnosis apparatus accordingly has an oil temperature sensor that measures temperature of the working oil. The arithmetic expression used by the computation module follows a model, which takes into account the temperature of the working oil that reflects the viscosity of the working oil, and the parameters include the temperature of the working oil measured by the oil temperature sensor. This arrangement of the preferable embodiment further enhances the accuracy of computation of the pressure difference.

In one preferable embodiment of the first abnormality diagnosis apparatus of the invention, the adjustable valve mechanism rotates a hydraulic vane fixed to the cam shaft in response to the control signal, thereby varying an open-close timing of the valve. The theoretical value computation module computes the physical behavior of the adjustable valve mechanism according to the physical model, on the assumption that a rotational motion of the hydraulic vane corresponds to a translational motion of a piston. This arrangement is also applicable to the second abnormality diagnosis apparatus of the invention.

Computation according to the physical model desirably reduces the total volume of calculation.

The theoretical value computed according to the physical model may include an error. The theoretical value computed according to the physical model may thus be calibrated under a specified condition.

The procedure of calibration, for example, initializes the theoretical value when the observed revolution speed of the crankshaft of the internal combustion engine is not higher than a preset level or reflects the observed value in the normal state on calculation of the theoretical value. This further enhances the accuracy of computation according to the physical model.

In another preferable embodiment of the first abnormality diagnosis apparatus of the invention, the theoretical value computation module constructs a linear model of the adjustable valve mechanism and carries out system identification according to the constructed linear model, so as to compute the physical behavior of the adjustable valve mechanism according to the physical model. This arrangement is also applicable to the second abnormality diagnosis apparatus of the invention.

Modern control theory gives the theoretical basis of such system identification and facilitates execution of the system identification. After construction of the linear model, an observer is used to estimate a status variable. Abnormality of the adjustable valve mechanism is thus readily determined, based on a result of comparison between a theoretical value of the status variable estimated by the observer and an actually measured value of the status variable. Various parameters are applicable for the status variable. This facilitates detection of an abnormality. Once the linear model is constructed, this technique enables a new model to be identified in a short time period in response to a change in type of the vehicle, thus significantly reducing the labor for development and desirably shortening the development time.

Any of the structures and arrangements of the invention discussed above may be combined together or partly omitted, according to the requirements. The technique of the invention is not restricted to the abnormality diagnosis apparatus, but is also actualized by an abnormality diagnosis method of the adjustable valve mechanism, an engine equipped with the adjustable valve mechanism, and a control method of such an engine with the adjustable valve mechanism. Any of these applications may also adopt the structures and arrangements discussed above.

These and other objects, features, aspects, and advantages of the present invention will become more apparent from the following detailed description of the preferred embodiment with the accompanying drawings.

BEST MODES OF CARRYING OUT THE INVENTION

Figure 1:
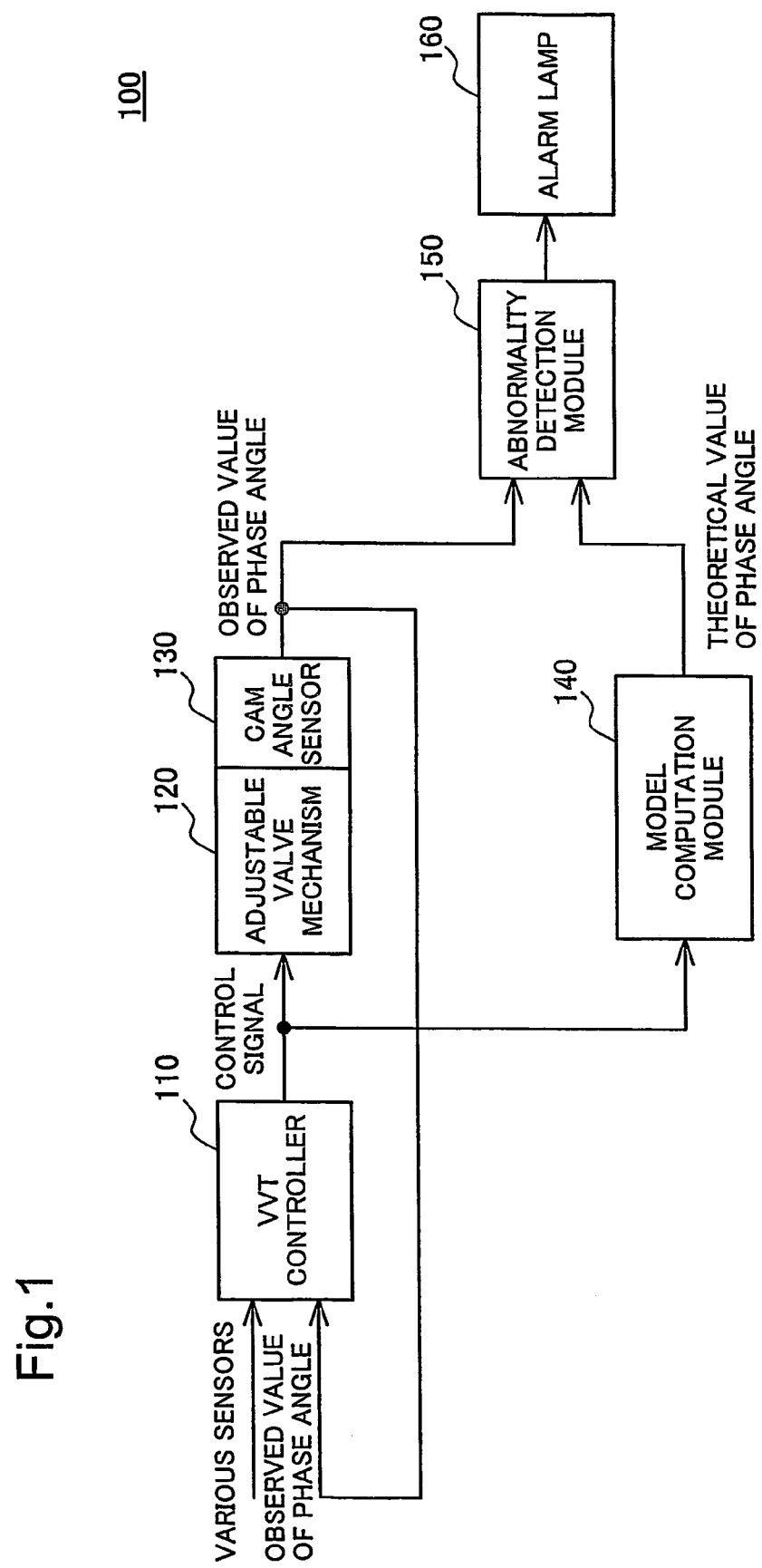
FIG. 1 is a block diagram schematically illustrating the configuration of an abnormality diagnosis system to diagnose an abnormality of an adjustable valve mechanism in one embodiment of the invention.

One mode of carrying out the invention is discussed below as a preferred embodiment in the following sequence:

A. General Configuration of Abnormality Diagnosis System
B. Structure of Adjustable Valve Mechanism
C. Physical Model
D. Abnormality Diagnosis Process
E. Modification A. General Configuration of Abnormality Diagnosis System FIG. 1 is a block diagram schematically illustrating the configuration of an abnormality diagnosis system 100 to diagnose an abnormality of an adjustable valve mechanism 120 in one embodiment of the invention. As illustrated, the abnormality diagnosis system 100 includes a VVT controller 110, the adjustable valve mechanism 120, a cam angle sensor 130, a model computation module 140, an abnormality detection module 150, and an alarm lamp 160. Among these constituents, the VVT controller 110, the model computation module 140, and the abnormality detection module 150 are actualized as software configuration by control programs stored in a ROM of an ECU (not shown).

The ECU is constructed as a microcomputer including a CPU, a RAM, and a ROM and has an input-output port connecting with various sensors and devices. The sensors connecting with the input port include the cam angle sensor 130, a vehicle speed sensor, an intake pressure sensor, a crankshaft sensor, an accelerator opening sensor, and an oil temperature sensor to measure the temperature of oil supplied to the adjustable valve mechanism 120. The devices connecting with the output port include the adjustable valve mechanism 120, the alarm lamp 160 of an instrument panel, a fuel injection device, an igniter, and a throttle actuator.

The VVT controller 110 receives inputs from the various sensors connecting with the input port of the ECU, sets a target phase angle of an intake cam shaft 12 (see FIG. 2), and outputs a control signal corresponding to the setting of the target phase angle to the adjustable valve mechanism 120.

The adjustable valve mechanism 120 regulates the phase angle of the intake cam shaft 12 relative to a crankshaft (not shown), in response to the control signal input from the VVT controller 110 and thereby varies an open-close timing of an air intake valve. The adjustable valve mechanism 120 will be described in detail later.

The cam angle sensor 130 detects an observed value of the phase angle of the intake cam shaft 12 regulated by the adjustable valve mechanism 120. The observed value of the phase angle is used for feedback control of the adjustable valve mechanism 120 by the VVT controller 110.

The model computation module 140 utilizes a physical model simulating a physical behavior of the adjustable valve mechanism 120 and computes a theoretical value of the phase angle of the intake cam shaft 12 corresponding to the input control signal.

The abnormality detection module 150 compares the observed value of the phase angle detected by the cam angle sensor 130 with the theoretical value of the phase angle computed by the model computation module 140 and determines whether the adjustable valve mechanism 120 is abnormal. When it is determined that the adjustable valve mechanism 120 has an abnormality, the alarm lamp 160 is lighted up to inform the driver of the abnormality of the adjustable valve mechanism 120. The state of abnormality is also recorded in the RAM of the ECU or a rewritable ROM.

B. Structure of Adjustable Valve Mechanism

Figure 2:
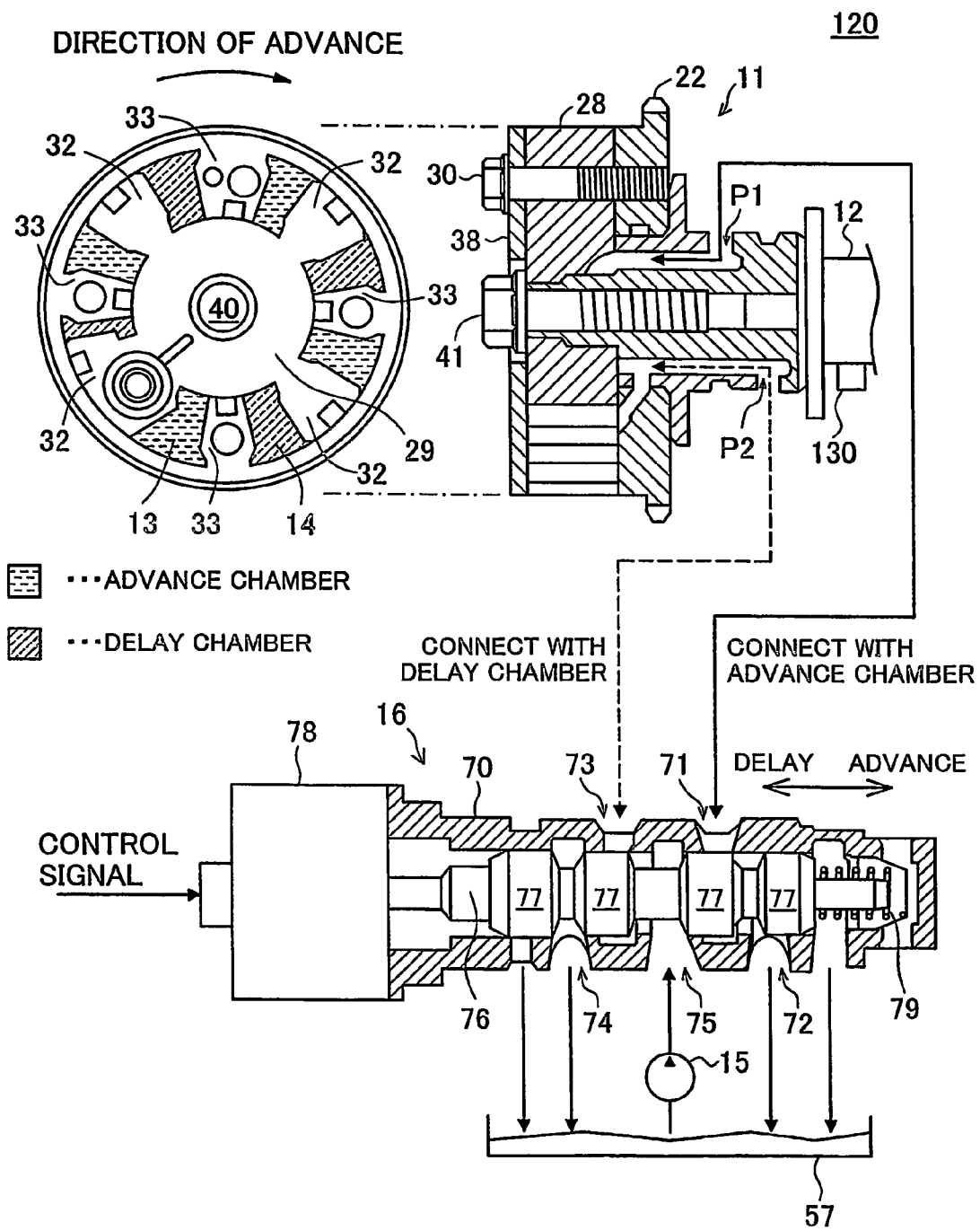
FIG. 2 shows the structure of the adjustable valve mechanism.

FIG. 2 shows the structure of the adjustable valve mechanism 120. The adjustable valve mechanism 120 includes a phase regulation mechanism 11 that is attached to one end of the intake cam shaft 12, an oil pump 15 that pressure-feeds oil to the phase regulation mechanism 11, and an oil control valve 16 that varies the path and the flow rate of the oil pressure-fed by the oil pump 15 in response to a control signal input from the ECU.

The phase regulation mechanism 11 has a hollow, roughly-cylindrical housing 28 and a vane 29 inserted in the housing 28 in a rotatable manner. The housing 28 is fixed with a cover 38 for covering over the vane 29 to a driven gear 22 by means of a bolt 30 and is integrally rotated with the cover 38 and the driven gear 22. The driven gear 22 is connected to the crankshaft by a timing chain.

The housing 28 has four projections 33, which are arranged at preset intervals and are protruded toward the axial center of the intake cam shaft 12. The four projections 33 and four pressure-receiving elements 32 of the vane 29 constitute four advance chambers 13 and four delay chambers 14. The vane 29 is fixed to the intake cam shaft 12 by means of a fixation bolt 41 inserted in a center hole 40 thereof and is integrally rotated with the intake cam shaft 12.

Since the vane 29 is rotatably inserted n the housing 28, regulation of the sizes of the advance chambers 13 and the delay chambers 14 changes the rotational phase of the intake cam shaft 12 relative to the crankshaft. The change of the rotational phase is attained by a supply of oil from the oil control valve 16 via either of an advance oil path P1 and a delay oil path P2, which respectively communicate with the advance chambers 13 and the delay chambers 14.

The oil pump 15 works with the driving force of an internal combustion engine as a driving source and pressure-feeds oil reserved in an oil pan 57 to the oil control valve 16.

The oil control valve 16 has a casing 70, a spool 76 that is inserted in the casing 70, an electromagnetic solenoid 78 that actuates the spool 76 in its axial direction, and a spring 79 that presses the spool 76 toward the electromagnetic solenoid 78. The casing 70 has an advance port 71 that connects with the advance oil path P1, a delay port 73 that connects with the delay oil path P2, an advance drain port 72 that drains the oil flown through the advance oil path P1 to the oil pan 57, a delay drain port 74 that drains the oil flown through the delay oil path P2 to the oil pan 57, and an inflow port 75 that receives an inflow of the oil pressure-fed from the oil pump 15.

The spool 76 has four valve elements 77 at positions to simultaneously close the advance port 71 and the delay port 73 and to simultaneously open the advance drain port 72 and the delay drain port 74. A shift of the spool 76 leftward (in the drawing) to connect the inflow port 75 with the delay port 73 and connect the advance port 71 with the advance drain port 72 allows the supply of oil to be flown through the delay oil path P2 to the delay chambers 14 and thereby rotates the vane 29 at a delay angle. On the contrary, a shift of the spool 76 rightward (in the drawing) to connect the inflow port 75 with the advance port 71 and connect the delay port 73 with the delay drain port 74 allows the supply of oil to be flown through the advance oil path P1 to the advance chambers 13 and thereby rotates the vane 29 at an advance angle.

The position of the spool 76 is determined by a balance between the rightward pressing force (in the drawing) of the electromagnetic solenoid 78 and the leftward pressing force (in the drawing) of the spring 79. The ECU outputs a duty signal as a control signal to the electromagnetic solenoid 78 to regulate the position of the spool 76. For example, output of a control signal representing a duty ratio of 100%, which is a maximum advance command, shifts the spool 76 to the right most position by the pressing force of the electromagnetic solenoid 78, so as to maximize the volume of the advance chambers 13. On the contrary, output of a control signal representing a duty ratio of 0%, which is a maximum delay command, shifts the spool 76 to the left most position by the pressing force of the spring 79, so as to maximize the volume of the delay chambers 14.

C. Physical Model

Figure 3:
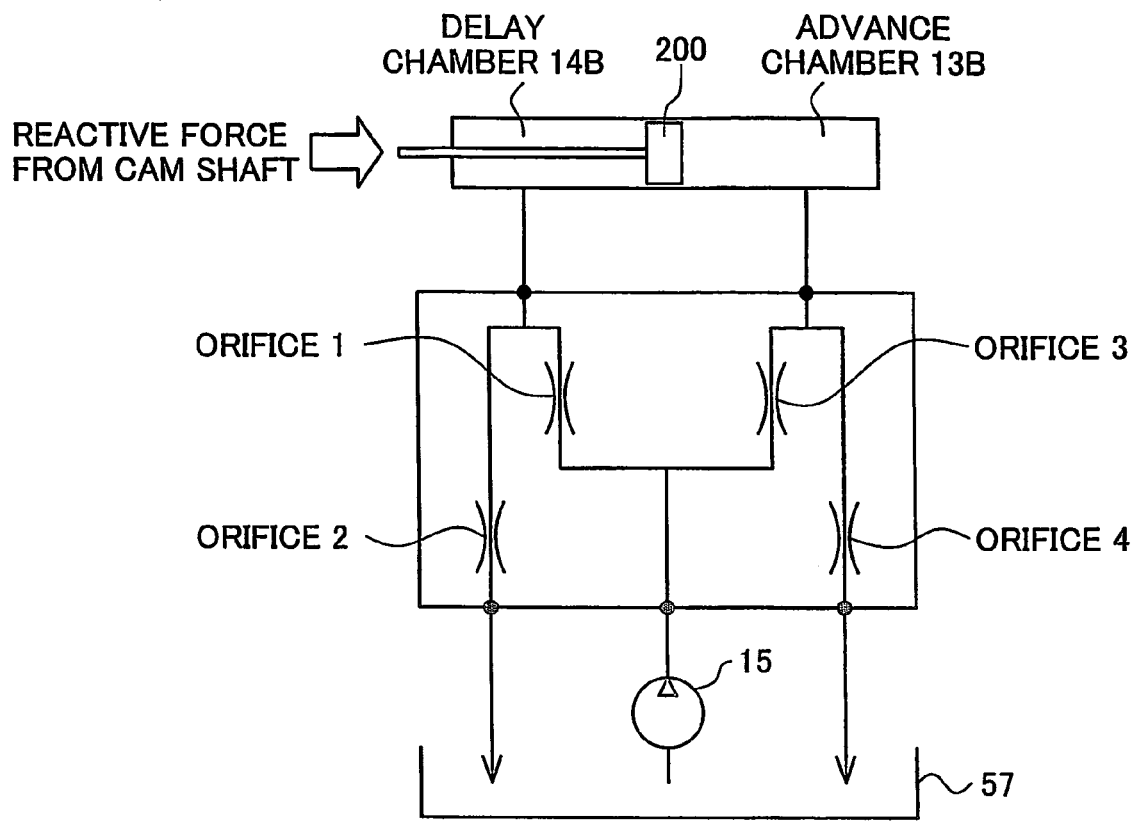
FIG. 3 shows a physical model simulating the adjustable valve mechanism.

FIG. 3 shows a physical model that simulates the adjustable valve mechanism 120 and is adopted by the model computation module 140. As described above, in the adjustable valve mechanism 120, the oil flow rate and the oil path through the oil ports 71 to 74 vary with the positional shift of the spool 76 in response to the input control signal to rotate the vane 29 of the phase regulation mechanism 11 either at the advance angle or at the delay angle. The procedure of the embodiment creates a physical model of FIG. 3 on the assumption that the rotational motion of the vane 29 corresponds to a translational motion of a piston 200 and the respective oil ports 71 to 74 of the oil control valve 16 correspond to orifices 1 to 4 and computes the phase angle based on the physical model. The assumption given here is that the orifice 1, the orifice 2, the orifice 3, and the orifice 4 respectively correspond to the delay port 73, the delay drain port 74, the advance port 71, and the advance drain port 72, that one advance chamber 13B corresponds to the four advance chambers 13, and that one delay chamber 14B corresponds to the four delay chambers 14.

Figure 4:
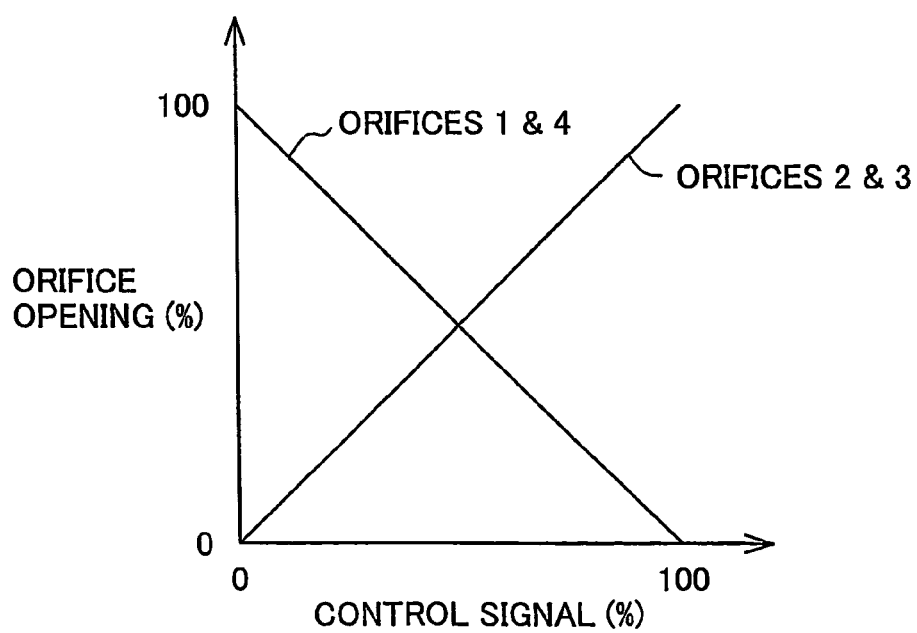
FIG. 4 is a graph used to determine openings of orifices.

FIG. 4 is a graph used to determine the openings of the respective orifices 1 to 4. The model computation module 140 inputs the duty signal as the control signal. The angle of each orifice is thus plotted as ordinate, and the duty ratio as the abscissa. For example, the control signal having the duty ratio of 100% represents the maximum advance command, as mentioned above. At the duty ratio of 100%, the openings of the orifices 3 and 2 reach their maxima, while the openings of the orifices 1 and 4 are practically equal to zero. The supply of oil fed from the oil pump 15 flows through the orifice 3 into the advance chamber 13B to move the piston 200 leftward (in the drawing). The leftward motion of the piston 200 causes the oil to be pressed out of the delay chamber 14B through the orifice 2 to the oil pan 57.

This procedure determines the opening of each orifice corresponding to the duty ratio of the control signal. One modified procedure may convert the duty ratio of the control signal into the position of the spool 76 and determine the opening of each orifice corresponding to the position of the spool 76.

In the physical model of FIG. 3, the translational motion of the piston 200 is expressed by Equation (1) given below:

$$\frac{d(MV)}{dt} = Ff - Fb - Fc \qquad (1)$$

where M and V denote a mass and a velocity of the piston 200 and Ff, Fb, and Fc respectively denote a force of the oil pressure of the advance chamber 13B applied onto the piston 200, a force of the oil pressure of the delay chamber 14B applied onto the piston 200, and a reactive force from the intake cam shaft.

The force Fc is determined by referring to a map or function set according to the revolution speed of the crankshaft. The force Fc generally increases with an increase in revolution speed of the crankshaft.

The forces Ff and Fb are expressed by Equations (2) and (3) given blow:

$$Ff = p_f S \qquad (2)$$

$$Fb = p_b S \qquad (3)$$

where pf, pb, and S respectively denote a pressure of the advance chamber 13B, a pressure of the delay chamber 14B, and a sectional area of the piston 200.

The pressures pf and pb are expressed by Equation (4) given below:

$$\frac{dp}{dt} = \frac{\beta}{V} q \qquad (4)$$

where V, β, and q respectively denote a volume of the advance chamber 13B or the delay chamber 14B, a modulus of volume elasticity of the oil, and an oil flow rate into the advance chamber 13B or the delay chamber 14B. At a start of the internal combustion engine, that is, in an initial state immediately after the start of computation based on the physical model, the volume of the advance chamber is minimum, the volume of the delay chamber is maximum, and the pressures in the advance chamber and the delay chamber are practically equal to the atmospheric pressure.

There is a small clearance between the pressure-receiving elements 32 of the vane 29 and the housing 28. Oil may thus be leak through this small clearance from the delay chamber to the advance chamber or from the advance chamber to the delay chamber. For simulation of such leakage in the physical model of FIG. 3, Equation (4) given above is rewritten as Equation (4b) by replacing the oil flow rate q with a result of subtraction Σq of a leaked oil flow rate from the total oil flow rate into the advance chamber 13B or the delay chamber 14B:

$$\frac{dp}{dt} = \frac{\beta}{V}\Sigma q \qquad (4b)$$

The oil flow rate q through each of the orifices 1 to 4 is expressed by Equation (5) given below:

$$q = CA\sqrt{2\Delta p/\rho} \qquad (5)$$

where C, A, $\Delta p$, and $\rho$ respectively denote a flow rate coefficient, an opening area of each orifice, a pressure difference between an upstream flow and a downstream flow of the orifice, and a viscosity of oil.

The value of oil pressure of the oil pump 15 is required to determine the flow rate q of the oil flown through the orifice 1 or the orifice 3. The value of oil pressure may be specified by referring to a map, which has been set in advance according to the revolution speed of the crankshaft and the temperature of the oil. In general, the oil pressure increases with an increase in revolution speed of the crankshaft and a decrease in oil temperature, while decreasing with a decrease in revolution speed of the crankshaft and an increase in oil temperature.

The flow rate coefficient C in Equation (5) given above varies with a variation in oil temperature. The oil flow rate q may thus be corrected according to a preset map representing the relation between the oil temperature and the flow rate coefficient C. In general, the higher oil temperature gives the greater flow rate coefficient C and thereby increases the oil flow rate q.

Combination of Equations (1) through (5) given above with the graph of FIG. 4 eventually determines the velocity V of the translational motion of the piston 200. Conversion of the velocity V of the translational motion of the piston 200 into an angular velocity of the vane 29 according to a predetermined arithmetic expression gives a theoretical value of the phase angle of the intake cam shaft 12.

Figure 5:
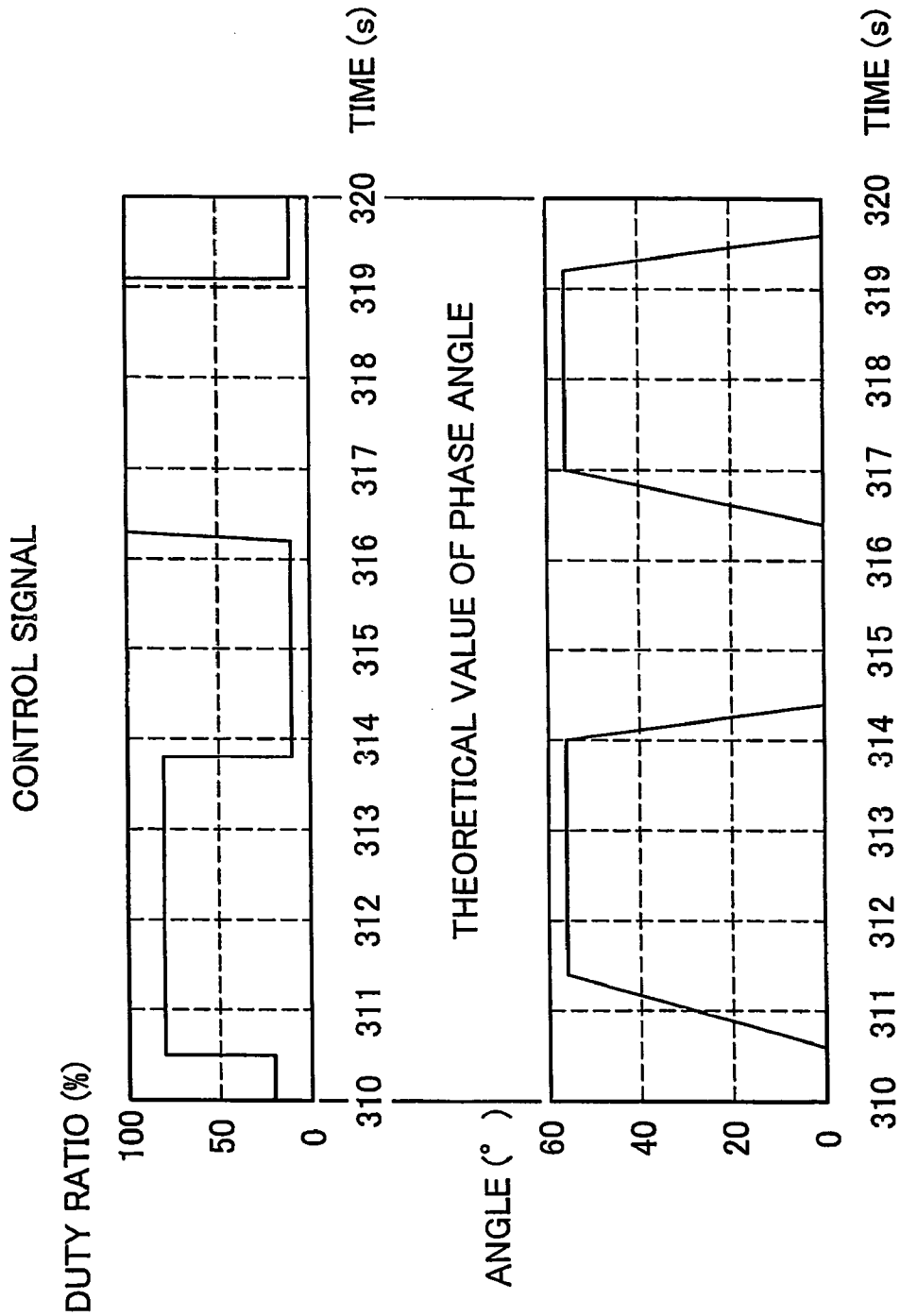
FIG. 5 is a graph showing a result of computation according to the physical model.

FIG. 5 is a graph showing a result of the computation based on the physical model described above. The upper graph shows a time variation of the duty ratio of the control signal. The lower graph shows a time variation of the theoretical value of the phase angle computed according to the physical model. As shown in these graphs, the theoretical value of the phase angle varies with a variation in control signal.

D. Abnormality Diagnosis Process

Figure 6:
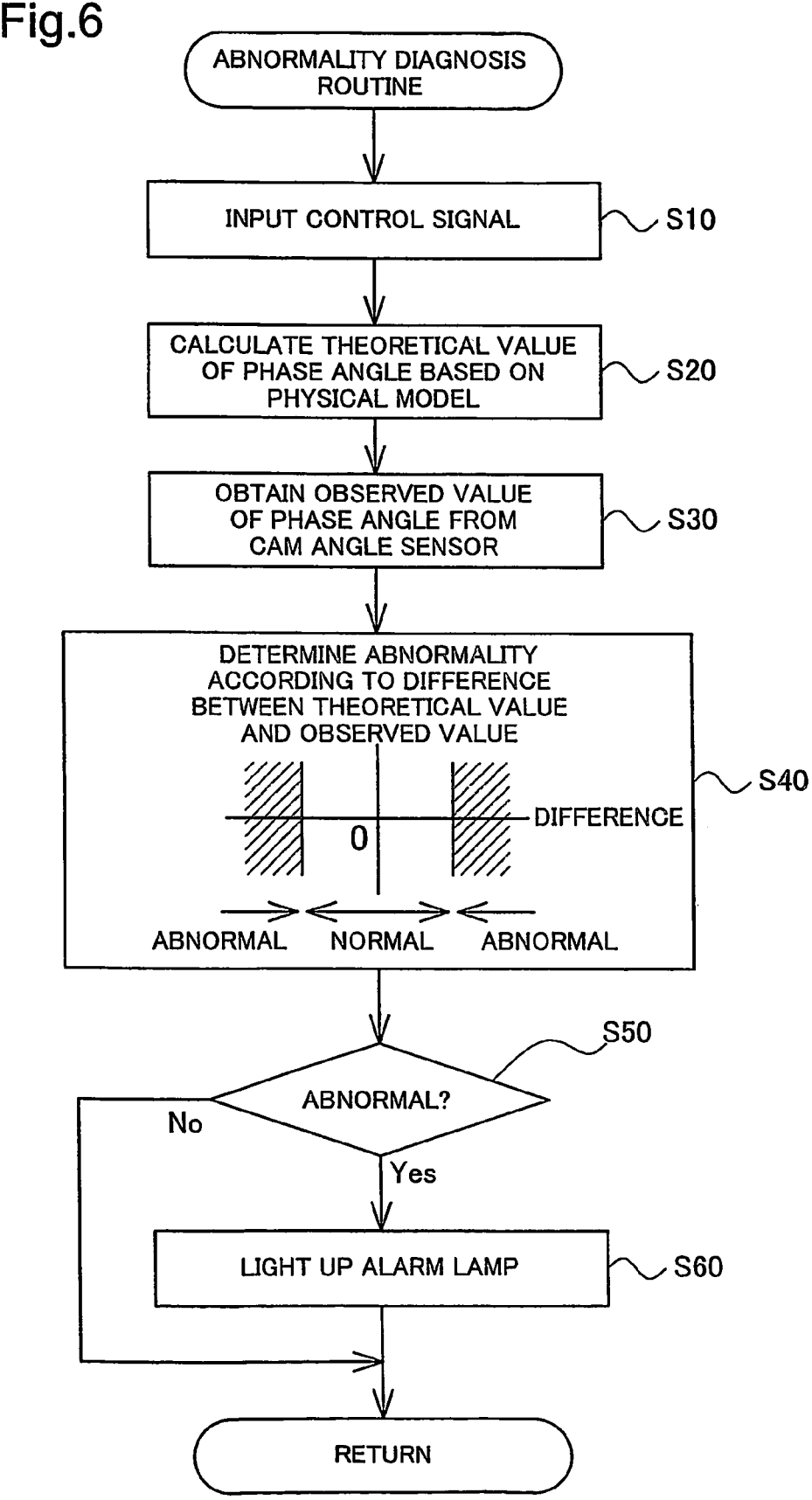
FIG. 6 is a flowchart showing an abnormality diagnosis routine executed in the embodiment.

FIG. 6 is a flowchart showing an abnormality diagnosis routine executed by the CPU of the ECU. The CPU first receives an input control signal (step S10), and computes a theoretical value of the phase angle of the intake cam shaft 12 based on the physical model described above (step S20). The CPU then obtains an observed value of the phase angle of the intake cam shaft 12 from the cam angle sensor 130 (step S30), and determines whether the adjustable valve mechanism 120 is abnormal or normal, based on a difference between the observed value and the theoretical value of the phase angle (step S40). When the difference exceeds a preset threshold value, which is determined by taking into account potential errors of the physical model and other relevant factors, it is determined that the adjustable valve mechanism 120 is abnormal. When the difference does not exceed the preset threshold value, on the other hand, it is determined that the adjustable valve mechanism 120 is normal. In the case of abnormal state (step S50: Yes), the alarm lamp 160 is lighted up (step S60). In the case of normal state (step S50: No), on the other hand, the CPU skips the processing of step S60. The series of this abnormality diagnosis routine is repeatedly executed during a drive of the vehicle.

As described above, the abnormality diagnosis system 100 of the embodiment creates the physical model simulating the physical behavior of the adjustable valve mechanism 120, computes the theoretical value of the phase angle of the intake cam shaft 12 according to the physical model, and compares the observed value of the phase angle with the theoretical value to determine whether the adjustable valve mechanism 120 is abnormal or normal. This arrangement enhances the accuracy of abnormality diagnosis, compared with the prior art abnormality diagnosis system that compares the target phase angle of the intake cam shaft with the observed value of the phase angle. The conventional abnormality diagnosis system may detect abnormality only under relatively limited conditions, for example, during an idle drive of the internal combustion engine. The abnormality diagnosis system 100 of the embodiment, on the other hand, detects abnormality of the adjustable valve mechanism 120 at any timing and thereby allows for timely countermeasure against a failure. Simple change of the parameters set in the physical model enables the physical model to be readily applied to various types of vehicles.

The embodiment discussed above is to be considered in all aspects as illustrative and not restrictive. There may be many modifications, changes, and alterations without departing from the scope or spirit of the main characteristics of the present invention. For example, the functions attained by the software configuration may be actualized by the hardware construction. Some other examples of possible modification are given below.

E. Modification (1) MODIFIED EXAMPLE 1

Computation of the phase angle based on the physical model may include some error, and accumulation of such errors may lower the accuracy of abnormality diagnosis. One possible modification thus calibrates the theoretical value computed according to the physical model, based on the result of the abnormality diagnosis and the driving conditions of the vehicle.

Figure 7:
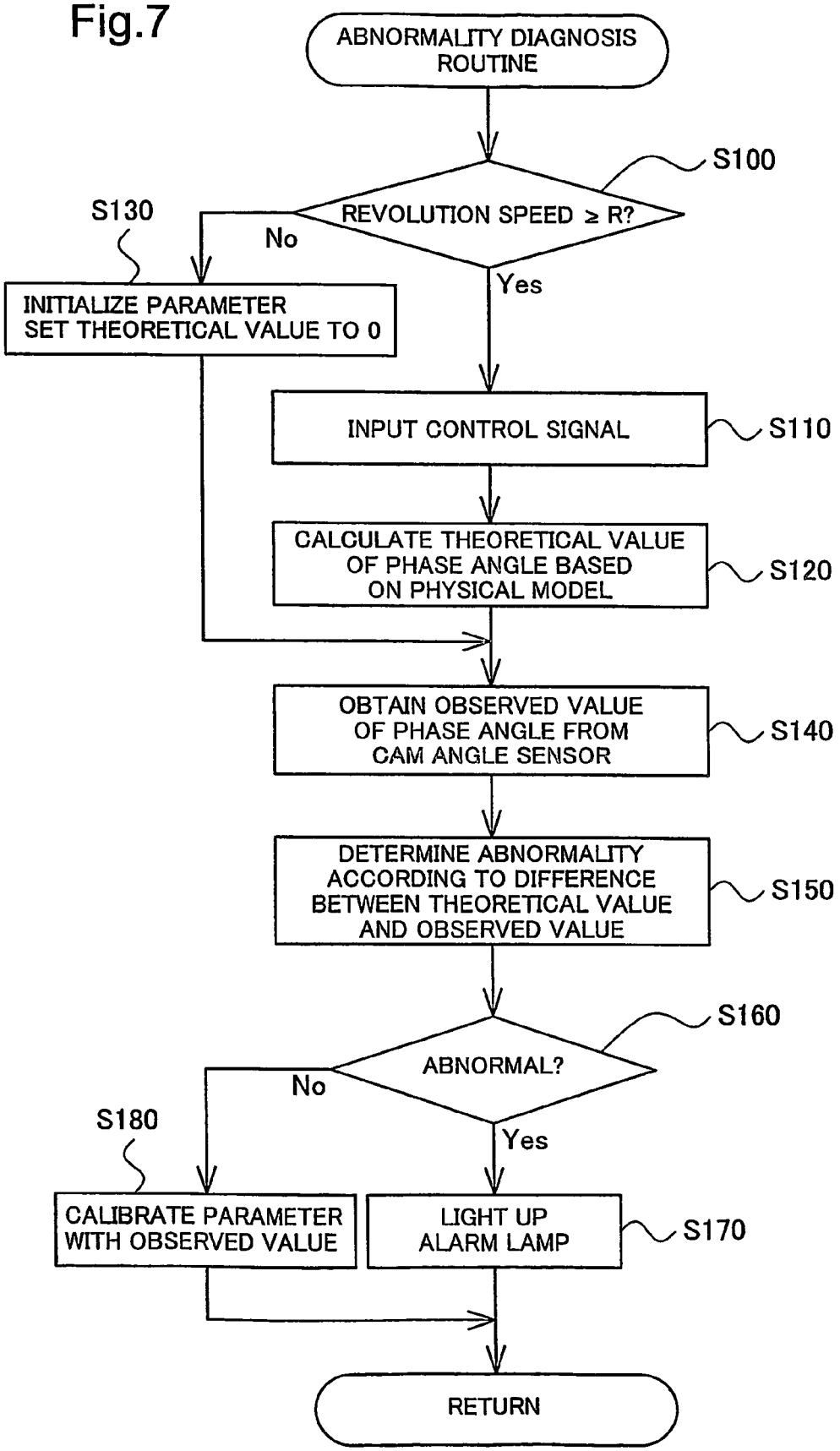
FIG. 7 is a flowchart showing a modified abnormality diagnosis routine including calibration of the computation result according to the physical model.

FIG. 7 is a flowchart showing a modified abnormality diagnosis routine, which includes calibration of the computation result according to the physical model and is executed in place of the flowchart of FIG. 6. The CPU of the ECU first determines whether the revolution speed of the crankshaft measured by the crankshaft sensor is not lower than a preset value R (step S100). When the observed revolution speed of the crankshaft is not lower than the preset value R (step S100: Yes), the CPU receives an input control signal (step S110), and computes the theoretical value of the phase angle of the intake cam shaft 12 based on the physical model (step S120). When the observed revolution speed of the crankshaft is lower than the preset value R (step S100: No), on the other hand, the CPU initializes the parameters of Equation (4) or Equation (4b) given above to maximize the volume of the delay chamber 14B and minimize the volume of the advance chamber 13B in the physical model, and minimizes the openings of the orifices 2 and 3 and maximizes the openings of the orifices 1 and 4 to set the theoretical value of the phase angle to zero (step S130).

The phase angle of the intake cam shaft 12 is typically regulated to advance with an increase in revolution speed of the crankshaft and delay with a decrease in revolution speed.

The preset value R may thus be a threshold value of the revolution speed at which the phase angle is kept at the maximum delay angle. The condition of step S100 is not restricted to the revolution speed of the crankshaft. The processing of step S130 may also be executed when the observed vehicle speed is lower than a preset level.

The CPU subsequently obtains the observed value of the phase angle of the intake cam shaft 12 from the cam angle sensor 130 (step S140), and determines whether the adjustable valve mechanism 120 is abnormal or normal, based on a difference between the observed value and the theoretical value computed at step S120 or set at step S130 (step S150).

In the case of abnormal state (step S160: Yes), the alarm lamp 160 is lighted up (step S170). In the case of normal state (step S160: No), on the other hand, the CPU calibrates the parameters used for the computation according to the physical model with the observed value of the phase angle (step S180). The concrete procedure of step S180 calculates back the volumes of the advance chamber 13B and the delay chamber 14B from the observed value of the phase angle and uses the calculated-back volumes for the subsequent computation according to the physical model. The series of this abnormality diagnosis routine is repeatedly executed during a drive of the vehicle.

This modified procedure calibrates the parameters used for the computation according to the physical model, when the revolution speed of the crankshaft is lower than the preset value R, that is, when the phase angle is expected to be equal to zero or when the result of abnormality diagnosis represents the normal state of the adjustable valve mechanism 120. This arrangement desirably reduces the potential accumulated errors in the computation according to the physical model and thereby ensures the highly accurate abnormality diagnosis. In the modified abnormality diagnosis routine, either of steps S130 and S180 may be omitted according to the requirements.

(2) MODIFIED EXAMPLE 2

Figure 8:
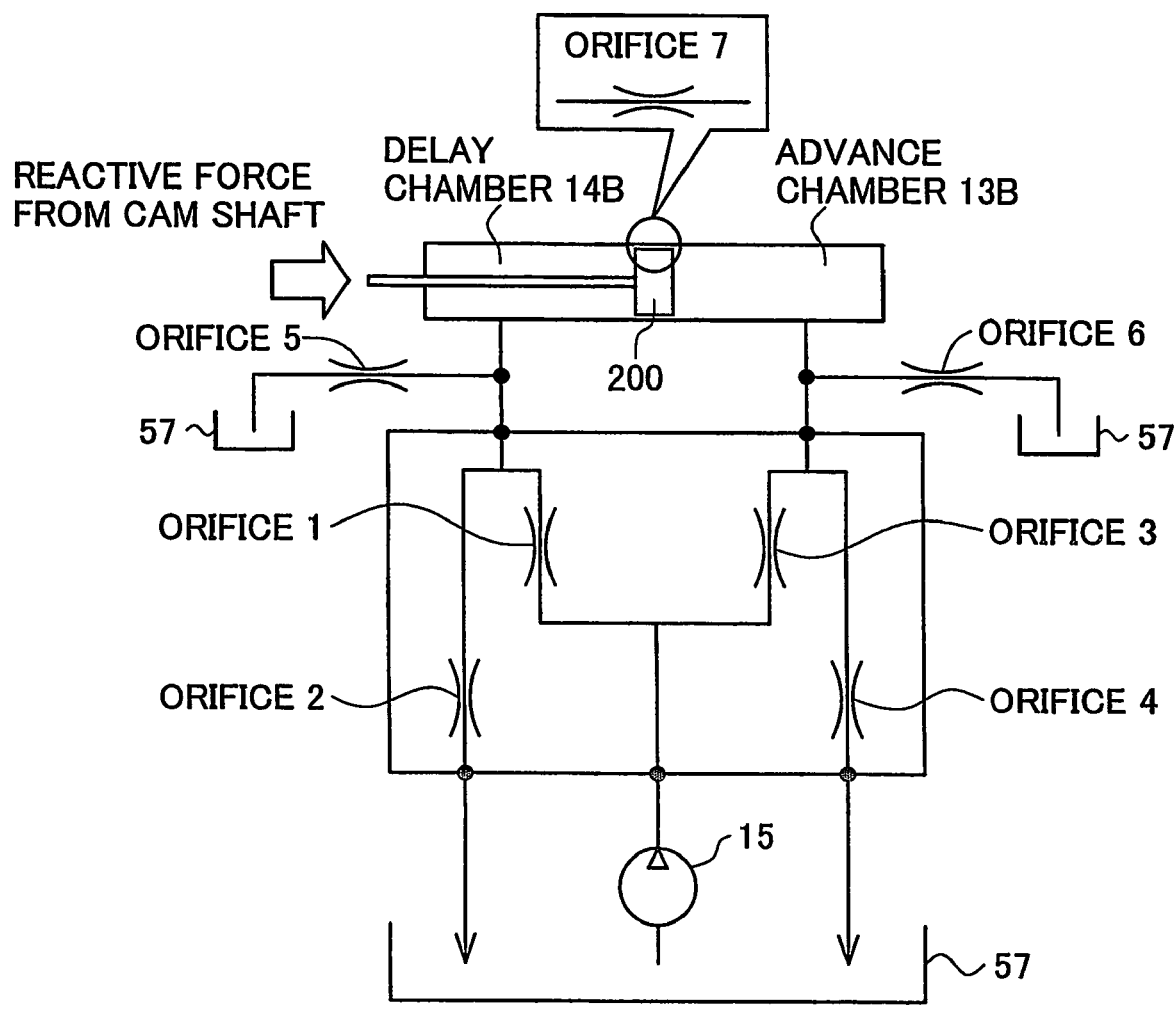
FIG. 8 shows a modified example of the physical model.

FIG. 8 shows a modified example of the physical model. This modified physical model is created on the assumption that oil leaks through clearances between the spool 76 and the casing 70. The clearances are given as orifices 5 and 6. The flow rate of oil through these clearances is calculated according to Equation (5) given above with the area of each clearance set to the opening area A of the orifice. The clearance in the piston 200 is also given as an orifice 7. Reflection of the potential oil leakage on the computation according to the physical model further enhances the accuracy of abnormality diagnosis.

(3) MODIFIED EXAMPLE 3

The abnormality diagnosis routine shown in the flowchart of FIG. 6 or the modified abnormality diagnosis routine shown in the flowchart of FIG. 7 determines the abnormal state of the adjustable valve mechanism 120, based on the difference between the theoretical value and the observed value of the phase angle of the intake cam shaft 12. One possible modification may determine the abnormal state of the adjustable valve mechanism 120, based on a difference between a theoretical value and an observed value of a variation in phase angle per unit time or based on a difference between an expected phase angle after elapse of a predetermined time period and an observed phase angle actually measured after elapse of the predetermined time period. For example, the procedure compares the expected phase angle to 30 degrees after elapse of 3 seconds computed according to the physical model with the observed phase angle actually measured after elapse of 3 seconds and determines the abnormality of the adjustable valve mechanism 120 based on the result of the comparison.

The procedure of the embodiment discussed above computes the physical behavior of the adjustable valve mechanism 120 according to the physical model shown in FIG. 3. One possible modification may construct a linear model of the adjustable valve mechanism 120 by modern control theory, adequately sets status variables of the linear model, and specifies a physical model (an equation of state and an output equation) corresponding to the adjustable valve mechanism 120 by the system identification technique. A status variable under control is estimable by an observer, which depends upon the identified equation of state and output equation. The modified procedure thus compares an actually observed value of the status variable with the status variable estimated by the observer (the theoretical value) and determines whether the adjustable valve mechanism 120 is abnormal or normal based on the result of the comparison. Diverse physical quantities are applicable to the status variable in this modified procedure. For example, the temperature of working oil may be used as one status variable. Other parameters, for example, the viscosity, the flow rate, and the pressure of working oil may also be used for the status variable. Once the linear model is constructed, this technique enables a new model to be identified in a short time period in response to a change in type of the vehicle and quickly sets a threshold value for abnormality diagnosis, thus desirably shortening the development time.

In the embodiment and its modified examples, the working fluid is oil having the temperature-dependent viscosity. In the case of working oil having little variation in viscosity against the temperature, the viscosity $\rho$ may be regarded as a fixed value. The working fluid is not restricted to oil but may be water or another incompressible fluid.

INDUSTRIAL APPLICABILITY

The technique of the invention regards the abnormality diagnosis device to diagnose an abnormality in the adjustable valve mechanism of the internal combustion engine and the corresponding abnormality diagnosis method, and is favorably applicable to various internal combustion engines, as well as automobiles, motorcycles, other vehicles, ships and boats equipped with the internal combustion engines.

The invention claimed is:

1. An abnormality diagnosis apparatus that diagnoses an abnormality of an adjustable valve mechanism, which varies a moving characteristic of a valve in an internal combustion engine, said abnormality diagnosis device comprising:

an input control signal module that inputs a control signal for varying the moving characteristic of the valve;

a theoretical value computation module that computes a physical behavior of the adjustable valve mechanism according to a physical model provided to simulate the physical behavior of the adjustable valve mechanism and thereby calculates a theoretical value of a parameter relating to the moving characteristic of the valve, which is varied by the adjustable valve mechanism, based on the input control signal;

an observed value detection module that detects an observed value of the parameter relating to the moving characteristic of the valve, which is varied by the adjustable valve mechanism, in response to the input control signal; and an abnormality detection module that determines whether the adjustable valve mechanism is abnormal or normal, based on the theoretical value and the observed value.

2. An abnormality diagnosis apparatus in accordance with claim 1, wherein said abnormality detection module determines that the adjustable valve mechanism is abnormal, when a difference between the theoretical value and the observed value is out of a preset range.

3. An abnormality diagnosis apparatus in accordance with claim 1, wherein the adjustable valve mechanism rotates a hydraulic vane fixed to a cam shaft in response to the input control signal, thereby varying an open-close timing of the valve, and said theoretical value computation module computes the physical behavior of the adjustable valve mechanism according to the physical model, on the assumption that a rotational motion of the hydraulic vane corresponds to a translational motion of a piston.

4. An abnormality diagnosis apparatus in accordance with claim 1, wherein said theoretical value computation module calibrates the theoretical value computed according to the physical model under a specified condition.

5. An abnormality diagnosis apparatus in accordance with claim 1, wherein said theoretical value computation module constructs a linear model of the adjustable valve mechanism and carries out system identification according to the constructed linear model, so as to compute the physical behavior of the adjustable valve mechanism according to the physical model.

6. An abnormality diagnosis apparatus that diagnoses an abnormality of an adjustable valve mechanism, which changes a phase of a cam shaft for opening and closing a valve in an internal combustion engine relative to a crankshaft of the internal combustion engine and thereby varies an opening-closing characteristic of the valve, said abnormality diagnosis apparatus comprising:

a fluid actuator that takes advantage of a pressure difference between two pressure chambers and thereby changes a phase difference between the cam shaft and the crankshaft;

a fluid control valve that switches over a state between a supply and a discharge of a working fluid to and from each of the two pressure chambers of said fluid actuator;

a control unit that outputs a control signal to said fluid control valve to switch over the state between the supply and the discharge of the working fluid;

a sensor that actually measures a phase difference between the cam shaft and the crankshaft;

a computation module that computes a pressure difference between the two pressure chambers in response to at least the control signal output from said control unit and calculates a phase difference between the cam shaft and the crankshaft from the computed pressure difference; and a determination module that compares the actual phase difference measured by said sensor with the calculated phase difference and determines that at least one of said fluid actuator and said fluid control valve is abnormal when a difference between the calculated phase difference and the measured phase difference is not less than a preset value.

7. An abnormality diagnosis apparatus in accordance with claim 6, said abnormality diagnosis apparatus further comprising:

a revolution speed sensor that measures a revolution speed of the internal combustion engine, wherein said computation module comprises a pressure difference computation module that uses an arithmetic expression based on a model constructed with flows of the working fluid in said fluid actuator and said fluid control valve and with a reactive force of the cam shaft, which depends upon the revolution speed of the internal combustion engine and is applied from the cam shaft onto said fluid actuator, and computes the pressure difference between the two pressure chambers with the control signal output from said control unit and the revolution speed of the internal combustion engine as parameters.

8. An abnormality diagnosis apparatus in accordance with claim 7, wherein the arithmetic expression used by said pressure difference computation module follows a model, which takes into account leakage of the working fluid between the two pressure chambers.

9. An abnormality diagnosis apparatus in accordance with claim 7, wherein the working fluid in said fluid actuator is working oil having a temperature-dependent viscosity, said abnormality diagnosis apparatus further comprising:

an oil temperature sensor that measures temperature of the working oil, wherein the arithmetic expression used by said pressure difference computation module follows a model, which takes into account the temperature of the working oil that reflects the viscosity of the working oil, and the parameters include the temperature of the working oil measured by said oil temperature sensor.

10. An abnormality diagnosis apparatus in accordance with claim 6, wherein the adjustable valve mechanism rotates a hydraulic vane fixed to the cam shaft in response to the control signal, thereby varying an open-close timing of the valve, and said computation module comprises a pressure difference computation module that computes the pressure difference between the two pressure chambers according to an arithmetic expression, which follows a model constructed on the assumption that a rotational motion of the hydraulic vane corresponds to a translational motion of a piston.

11. An abnormality diagnosis apparatus in accordance with claim 6, wherein said computation module carries out calibration with the computed phase difference under a specified condition.

12. An abnormality diagnosis apparatus in accordance with claim 6, wherein said computation module constructs a linear model of the adjustable valve mechanism and carries out system identification according to the constructed linear model, so as to compute the pressure difference between the two pressure chambers.

13. An abnormality diagnosis apparatus in accordance with claim 8, wherein the working fluid in said fluid actuator is working oil having a temperature-dependent viscosity, said abnormality diagnosis apparatus further comprising:
an oil temperature sensor that measures temperature of the working oil, wherein the arithmetic expression used by said pressure difference computation module follows a model, which takes into account the temperature of the working oil that reflects the viscosity of the working oil, and the parameters include the temperature of the working oil measured by said oil temperature sensor.

14. An abnormality diagnosis apparatus that diagnoses an abnormality of an adjustable valve mechanism, which varies a moving characteristic of a valve in an internal combustion engine, said abnormality diagnosis apparatus comprising:

a receiver that receives an input control signal for varying the moving characteristic of the valve;

a calculator that computes a physical behavior of the adjustable valve mechanism according to a physical model and thereby calculates a theoretical value of a parameter relating to the moving characteristic of the valve, which is varied by the adjustable valve mechanism, in response to the input control signal;

an observer that observes a value of the parameter relating to the moving characteristic of the valve, which is varied by the adjustable valve mechanism, in response to the input control signal; and a detector that detects the abnormality of the adjustable valve mechanism, based on the difference between the theoretical value and the observed value.

15. An abnormality diagnosis method that diagnoses a abnormality of an adjustable valve mechanism, which varies an moving characteristic of a valve in an internal combustion engine, said abnormality diagnosis method comprising the steps of:

inputting a control signal for varying the moving characteristic of the valve;

computing a physical behavior of the adjustable valve mechanism according to a physical model and thereby calculating a theoretical value of a parameter relating to the moving characteristic of the valve, which is varied by the adjustable valve mechanism, in response to the input control signal;

detecting an observed value of the parameter relating to the moving characteristic of the valve, which is varied by the adjustable valve mechanism, in response to the input control signal; and determining whether the adjustable valve mechanism is abnormal or normal, based on the theoretical value and the observed value.

16. An abnormality diagnosis method that diagnoses an abnormality of an adjustable valve mechanism, which changes a phase of a cam shaft for opening and closing a valve in an internal combustion engine relative to a crankshaft of the internal combustion engine and thereby varies an opening-closing characteristic of the valve, said abnormality diagnosis method comprising the steps of:

providing a fluid control valve that switches over a state between a supply and a discharge of a working fluid to and from each of two pressure chambers included in a fluid actuator, which takes advantage of a pressure difference between the two pressure chambers and thereby changes a phase difference between the cam shaft and the crankshaft;

outputting a control signal to said fluid control valve to switch over the state between the supply and the discharge of the working fluid;

actually measuring a phase difference between the cam shaft and the crankshaft with a sensor;

computing a pressure difference between the two pressure chambers in response to at least the control signal;

calculating a phase difference between the cam shaft and the crankshaft from the computed pressure difference; and comparing the actual phase difference measured by the sensor with the calculated phase difference and determining that at least one of the fluid actuator and the fluid control valve is abnormal when a difference between the calculated phase difference and the measured phase difference is not less than a preset value.

* * * * *